United States Patent [19]

Cronan

[11] Patent Number: 4,470,519

[45] Date of Patent: Sep. 11, 1984

[54] APPARATUS FOR FEEDING BALLS

[76] Inventor: Walter I. Cronan, 125 Lakeview Ave., Leonia, N.J. 07605

[21] Appl. No.: 354,396

[22] Filed: Mar. 3, 1982

[51] Int. Cl.³ .............................................. B65H 1/30
[52] U.S. Cl. .................................... 221/188; 221/265
[58] Field of Search ............... 221/188, 265, 177, 179, 221/182, 186, 187; 222/169, 170, 167, 367, 370; 414/217; 211/74, 77

[56] References Cited

U.S. PATENT DOCUMENTS 3,253,738  5/1966  Bromley .......................... 221/265 X

FOREIGN PATENT DOCUMENTS 2066213  7/1981  United Kingdom ................ 222/167

Primary Examiner—Stanley H. Tollberg
Attorney, Agent, or Firm—Darby & Darby

[57] ABSTRACT

An apparatus is disclosed for producing a serial flow of balls comprising a ball feeding apparatus cooperating with means for rotating it about an axis. The apparatus comprises: (a) a container for receiving balls to be fed having a wall symmetrically disposed about said axis and a base fixed to and enclosing one end of this wall, the base having at least one outlet port extending therethrough and spaced along its periphery; and (b) at least one tubular member corresponding to the port, the member being fixed at one end to the base at the port, curving away from the base and towards the axis, for leading balls away from the container to an outlet at the other end of the tubular member. The tubular member has its outlet in closer proximity to the axis than the port on the container base.

10 Claims, 5 Drawing Figures

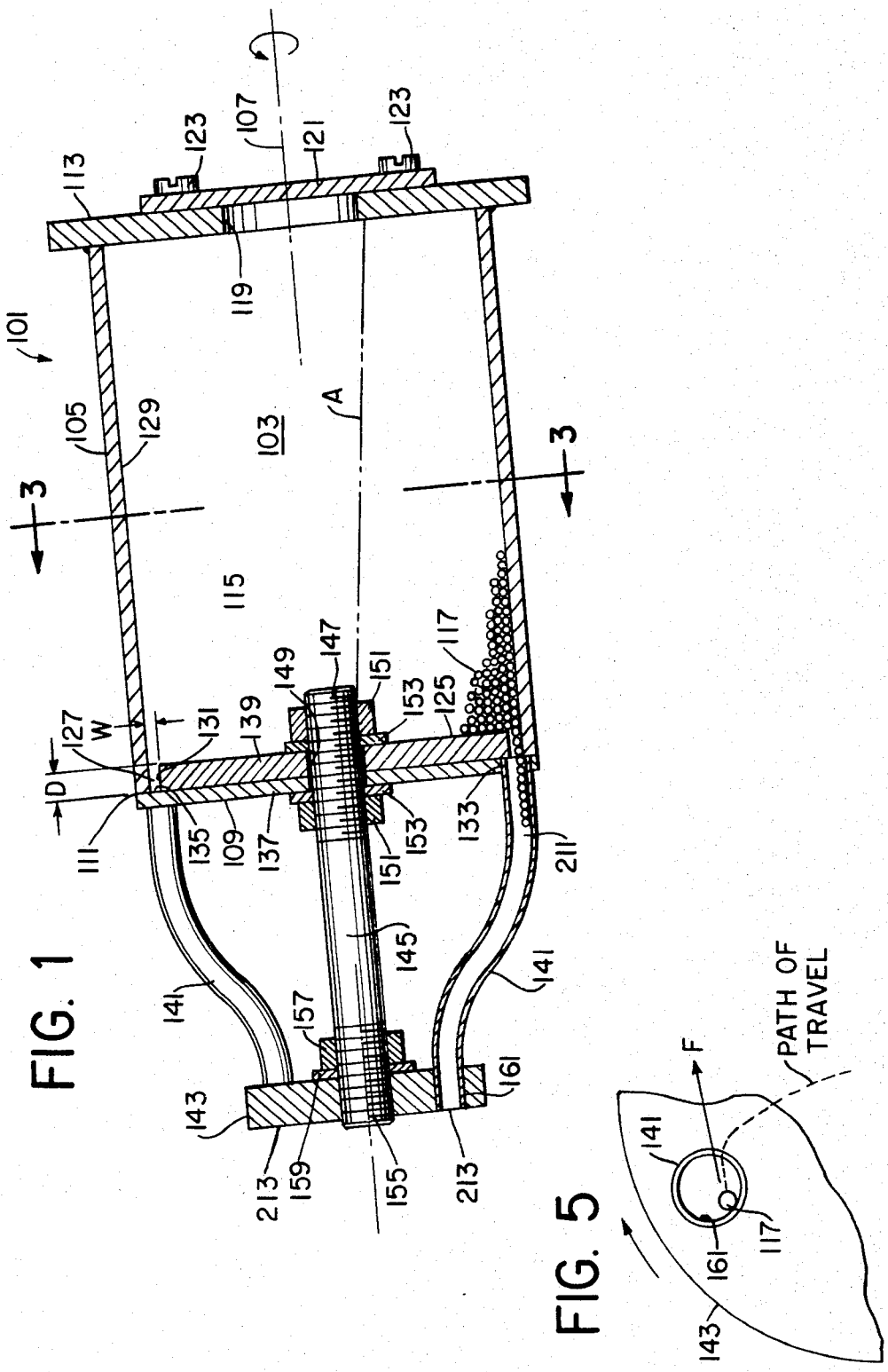

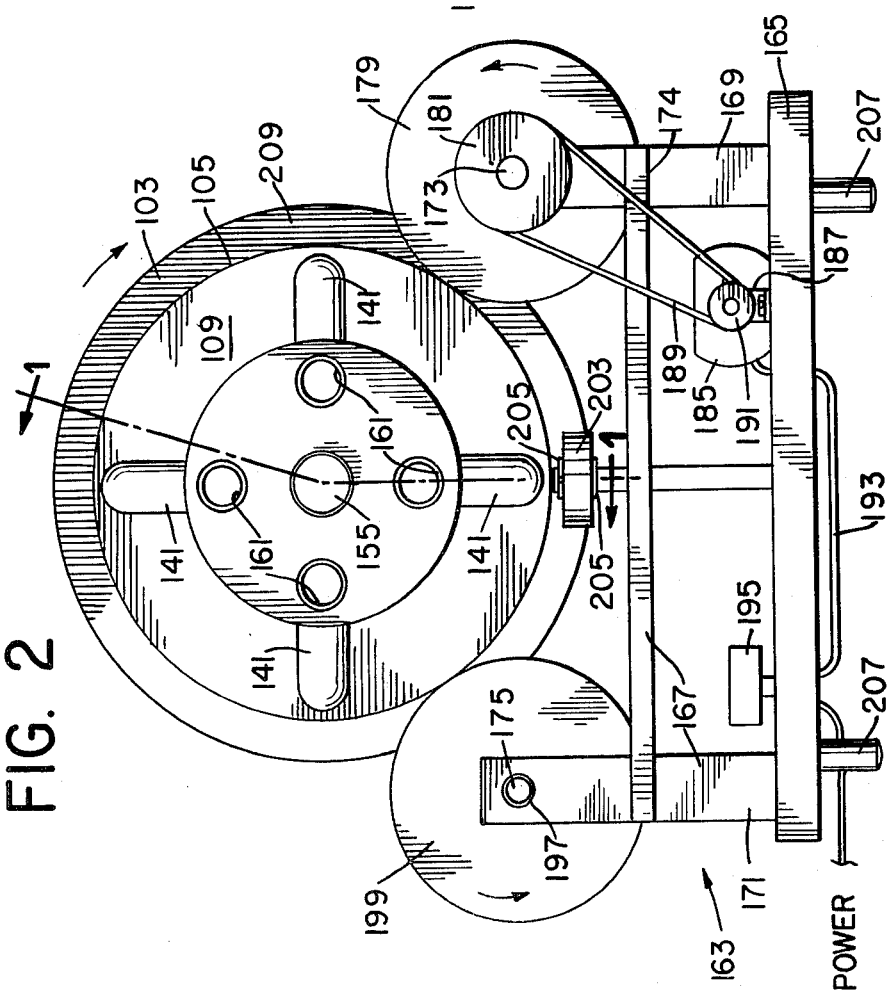

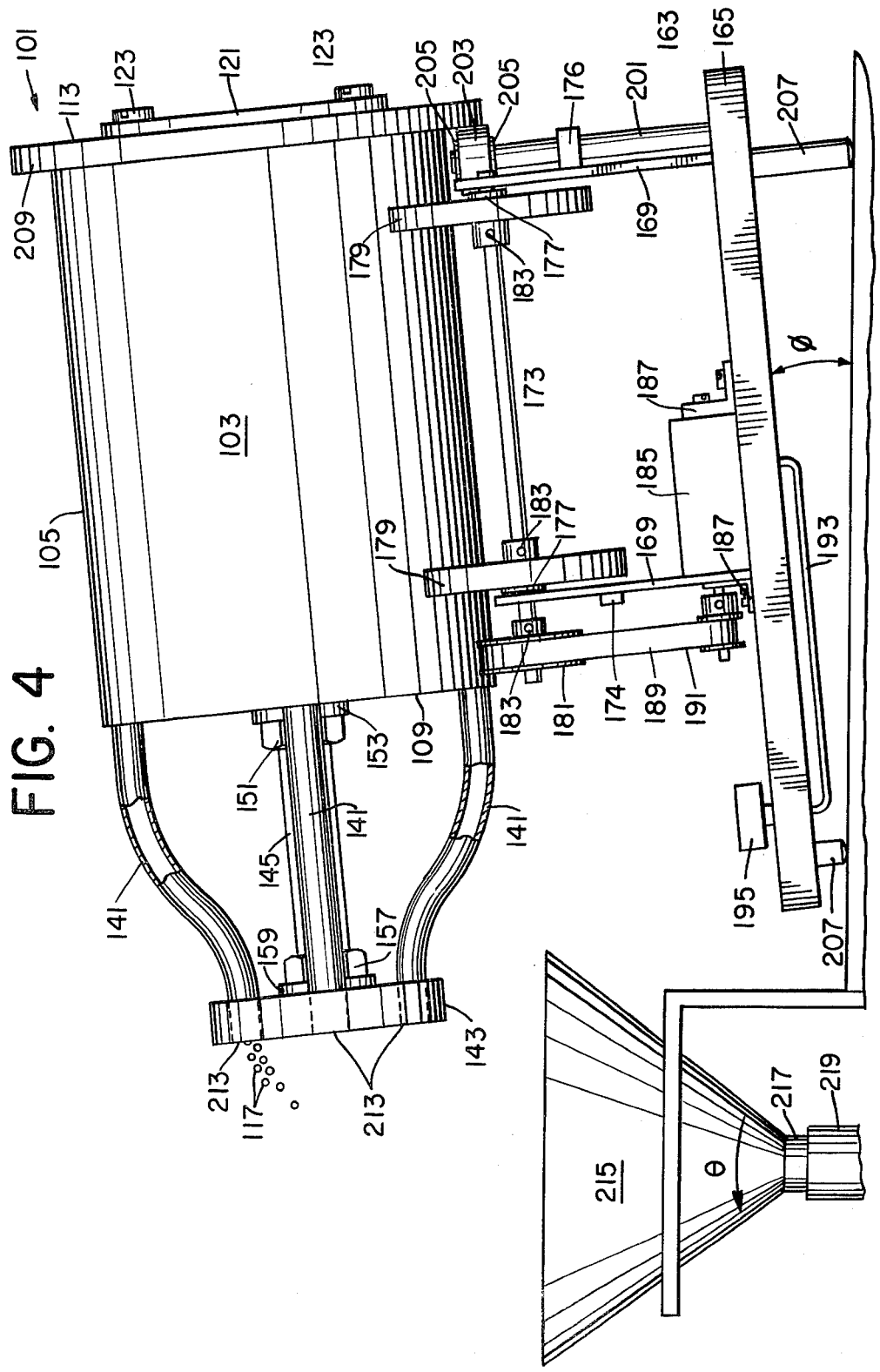

APPARATUS FOR FEEDING BALLS

BACKGROUND OF THE INVENTION

This invention relates to the field of ball feeding methods and apparatus in general, and more specifically to a method and apparatus for use with balls of a substantially uniform diameter for providing a continuous, rapid flow of said balls.

One of the limiting factors in the speed of manufacturing systems using very large quantities of balls has been the rate with which those balls can be organized and fed from a massive quantity into a continuous, serially flowing stream of individual balls. The problems encountered with ball feeding systems becomes especially acute in the case of small, high tolerance balls, as used in ballpoint pens, which are prone to jamming and burring in conventional feeding apparatus. Such feeding systems suffer from a substantial amount of "down time" spent while freeing jammed balls from the feeder mechanism, as well as a substantial number of reject balls whose surfaces are unacceptably burred or flattened while being handled by the feeder Prior art ball feeders primarily comprise the "gum ball" type of feeder, in which a metal disc is rotated at the bottom, or base, of a hollow cylinder filled with balls. Holes or radial slots are bored through the disc, forming an open topped enclosure between the walls of the moving hole or slot and the fixed base of the cylinder upon which the disc rotates. The balls at the bottom of the cylinder fall into these enclosures and are carried by the rotating disc until the hole (or slot) overlies an exit hole in the base of the cylinder. The balls then fall from the rotating disc into the hole in the cylinder base and are fed to a desired location by ramps or tubes.

One of the major disadvantages of gum ball-type feeders results from the scissoring action between a hole in the cylinder base and a corresponding hole in the disc, as the latter rotates out of alignment with the former. Especially in the case of small balls, this scissoring action may catch a ball halfway between the disc and the base and either burr the surface of the ball or jam it in between the disc and the cylinder base.

A further disadvantage, especially with balls made of soft material such as silver or indium, lies in the fact that after a hole or slot in the disc has been filled, the tops of the enclosed balls moving with the disc form a rough surface which moves past the stationary balls above the disc and causes flat spots on both the moving and stationary balls. This effect is accentuated by the fact that the stationary bottom layer of balls are not isolated from the pressure of the mass of balls above the bottom layer, and thus are squeezed between the tops of the enclosed, moving balls and the mass of balls above them as the disc rotates.

In order to minimize the down time and damage caused by the above described problems with conventional gum ball feeders, the feeders must be operated at a relatively slow rate of speed, thus limiting the speed with which a manufacturing process can be carried out.

It is therefore an object of the present invention to provide a high speed system for feeding a mass or load of balls to an external apparatus in a serial array, with a minimum of down time and ball damage.

SUMMARY OF THE INVENTION

A method and apparatus for feeding balls is provided in which a ball feeder is rotated about a rotational axis as a load of balls is fed therethrough. As the balls leave the rotating feeder they fall into a funnel which translates their motion into a smooth, downwardly converging spiral. After spiraling through the funnel the balls emerge in a continuous, serial array which can be fed into a desired apparatus for inspection or other processing.

In one aspect of the invention, the base of the container comprises a number of outlet ports extending through the base and spaced along its periphery. Each outlet port empties into a curved tube which rotates with the container and leads balls from the outlet port to a tube outlet. The tube outlet is disposed in closer proximity to the ball feeder's rotational axis than the outlet port from which the tube leads. When the ball feeder is mildly inclined above the horizontal and rotated, the curved tubes prevent release of balls therein until a given tube is near the peak of rotation.

In another aspect of the invention, the container base comprises a ball transport channel disposed along the interior surface of the container wall and having a channel base defined by the container base. The channel is dimensioned with a width less than twice the diameter of a ball to be fed and a depth of at least one ball diameter. A plurality of outlet ports are defined in the container base between the base of the channel and the exterior of the container, providing an axially rotating path through which balls at the base of the channel may flow to the container's exterior.

BRIEF DESCRIPTION OF THE DRAWINGS

FIG. 1 is a cross-sectional view through line 1—1 of FIG. 2 illustrating a preferred embodiment of a ball feeder according to the invention;

FIG. 2 is a front elevational view of the ball feeder of FIG. 1, seated on a device for rotating the ball feeder about its axis;

FIG. 3 is a cross-sectional view along line 3—3 of FIG. 1;

FIG. 4 is a side elevational view of the ball feeder and rotating device of FIG. 2, illustrating the cooperation of the ball feeder and collecting funnel according to the invention;

FIG. 5 is an enlarged fragmentary frontal view of the preferred ball feeder as in FIG. 2, illustrating the path of travel of a ball as it leaves the ball feeder.

DESCRIPTION OF THE PREFERRED EMBODIMENT

FIGS. 1–3 of the drawing illustrate a preferred embodiment of a ball feeder 101 according to the present invention. Ball feeder 101 comprises a hollow cylindrical container 103 for receiving a load of balls to be serially fed to an external apparatus, such as a machine for determining defects in the roundness or size of the balls. Container 103 comprises a cylinder wall 105 symmetrically disposed about a rotational axis 107. A circular container base 109 is disposed across cylinder wall 105 and fixed thereto, as by a glued joint 111. An annular end plate 113 is similarly glued across the other end of cylinder wall 105, forming an enclosed cylindrical space 115 into which a group of balls 117 may be loaded through the central hole 119 in annular end plate 113. A disc-shaped cover 121 may be mounted over central loading hole 119 by screws 123 or the like, after a load of balls 117 has been placed in container 103. The parts of container 102 described above are preferably made of clear plastic, such as LUCITE ™, so that the quantity of balls left in container 103 may be visually monitored.

Container base 109 is preferably constructed with a raised central portion 125, defining a peripheral, inner channel 127 between the interior surface 129 of cylinder wall 105 and the periphery 131 of the raised base portion 125, for transporting balls 117 from cylindrical space 115 to a plurality of outlet ports 133. The width (W) of ball transport channel 127, measured in the radial direction relative to axis 107 (see FIG. 1), is preferably less than twice the diameter of balls 117, so that only one ball fits widthwise in the channel as shown in FIG. 1. The axial depth (D) of channel 127 should at least be equal to one ball diameter, and is preferably several ball diameters deep. This feature of the invention effectively isolates the balls at the base 135 of channel 127 so that they are not directly supporting the weight of the load of balls 117 outside of the channel in cylindrical space 115. The balls at the base 135 of channel 127 are thus free to flow into outlet ports 133 without likelihood of jamming. Outlet ports 133 are provided in container base 109 between the base 135 of channel 127 and the exterior of container 103. Outlet ports 133 should at least be large enough to permit passage of one ball. In the illustrated embodiment, outlet port 133 has a circular cross-section with a diameter several times greater than the diameter of one of the balls 117, permitting a plurality of balls to flow side by side through an outlet port.

In the preferred embodiment illustrated, the container base 109 is constructed with a flat circular disc 137 having a diameter equal to the outer diameter of cylinder wall 105. Four outlet ports 133 are then drilled through the disc near its periphery, 90 degrees apart, as seen in FIG. 3. A second circular disc 139, having a diameter chosen to provide the desired channel width as discussed above, may then be centered on disc 137 and glued or similarly attached thereto. The container base 109, comprising discs 137 and 139, may now be glued in place across one end of cylinder wall 105 as seen in FIG. 1 with the second disc defining the above-mentioned raised portion 125.

Connected to container 103 at each of outlet ports 133 is a tube 141 which is held in an S-shaped configuration between its respective outlet port and a support disc 143. Support disc 143 is connected to the base 109 of container 103 by shaft 145, which holds support disc 143 in a coaxial, fixed relationship to cylindrical container 103. The shaft is mounted to container 103 by inserting threaded end 147 through a central hole 149 bored in container base 109, and locking it in place with nuts 151 and washers 153. Support disc 143 is preferably tapped and threaded onto the opposite end 155 of shaft 145, where it is locked in place by nut 157 and washer 159.

Support disc 143 is provided with four holes 161 which are each dimensioned to receive one end of a corresponding tube 141. The tubes 141 may be retained in holes 161 by epoxy or any other suitable means. The other end of each of tubes 141 is similarly inserted in its respective outlet port 133 on container 103, and held in place by epoxy or the like. Tubes 141 are preferably made of lengths of tightly wound spring steel wire, flexed into the appropriate S-shape, which tends to hold the tubes rigidly in place between support disc 143 and base 109, due to its inherent springiness. The tubes may then be inserted or removed without the need for epoxy or other adhesive material.

FIGS. 2 and 4 show ball feeder 103 seated on a rotating device 163. Rotating device 163 comprises a platform 165 with a framework 167 of horizontal and vertical members mounted thereon. Two pairs of vertical members 169 and 171 provide support for parallel axles 173 and 175. Horizontal framework supporting members 174 and 176 connect vertical members 169 and 171 at the front and rear, respectively, to provide structural rigidity. Axle 173 is journaled in bearings 177 on vertical members 169. Driving wheels 179 and pulley 181 are coaxially aligned on axle 173 and locked in place by set screws 183. Variable speed motor 185 is mounted on platform 165 by brackets 187. Belt 189 connects pulley 181 to pulley 191 on the shaft of motor 185, thereby providing rotational force to driving wheels 179. Electric leads 193 are connected to an external source of electricity through rheostat 195 or other suitable means for varying the speed of motor 185.

In a similar manner to that of axle 173, free wheeling axle 175 is journaled in bearings 197 on vertical members 171, maintained in a parallel relationship to axle 173 by framework 167. A pair of undriven wheels 199 are mounted to free wheeling axle 175 in the same manner as driven wheels 179 on axle 183. Undriven wheels 199 are therefore free to rotate in their bearings, while the rotation of driven wheels 179 is controlled by the speed of motor 185.

Vertical shaft 201 is mounted on platform 165 and passes through horizontal framework supporting member 176. A horizontally oriented wheel 203 is held in place on vertical shaft 201 by C-clips 205, and provides a free-wheeling bearing surface to a flange 209 of ball feeder 103, as described later in this specification.

Threaded legs 207 and corresponding vertically tapped holes in platform 165 may also be provided, so that the tilt angle $\phi$ of platform 165 may be adjusted (see FIG. 4).

In operation, a load of balls preferably having substantially uniform diameters is placed in container 103 through the central loading hole 119 in end plate 113. For reasons which will become apparent later, a full load of balls 117 preferably fills less than half of container 103, as indicated by dotted line A in FIG. 1. After replacing cover 121, ball feeder 101 may be stored with its full load of balls until ready for use. It should be noted that two or more ball feeders 101 are generally used with a single rotating device 163 for continuous duty applications, so that a new, fully loaded ball feeder 101 may quickly be interchanged with the previous ball feeder after its load has emptied.

Ball feeder 101 is operated by placing it on rotating device 163 as shown in FIGS. 2 and 4, with its cylinder wall 105 resting against and supported by driven wheels 179 and undriven wheels 199, and with flange 209 resting against horizontal wheel 203. Rotating device 163 is tilted, as by adjusting threaded legs 207, so that balls 117 are gravity fed through any of outlet ports 133 which are in contact with the load of balls at a given point in the rotational cycle of the ball feeder. Since the load of balls preferably occupies the lower half of container 103, balls only leave the container through outlet ports 133 which are in the lower half of the ball feeder's rotational cycle at a given point in time.

As balls 117 flow through a particular outlet port 133, they enter a corresponding tube 141 at its outermost portion; that is, the portion farthest from the rotational axis 107 of the ball feeder. Since the balls are entering tube 141 during the lower half of the rotational cycle, the outlet 213 of tube 141 is higher than the outer portion 211, so the balls collect in the outer portion 211 and cannot flow out of the tube. As the ball feeder 103 continues to rotate, that tube 141 is carried into the upper half of the ball feeder's rotational cycle, at which point the corresponding outlet port 133 of container base 109 has risen above the load of balls 117 in container 103, so that the balls are no longer flowing through that outlet port 133 into its corresponding tube. The balls in the outer portion 211 of the tube under discussion are no longer under any pressure from the remaining load of balls in container 103, and are therefore less likely to jam or clog as they flow toward the tube's outlet 213. As the ball feeder 101 continues to rotate and the tube approaches the top of the ball feeder's rotational cycle, the outer portion 211 of the tube is raised above the level of the tube outlet 213, and the group of balls which collected in the outer portion slide down the tube and flow out from the tube outlet 213 as seen in FIG. 4.

When a ball 117 flows out of a tube 141, the rotational movement of the tube imparts a laterally directed force F to the ball in the direction of the tube's rotation (see FIG. 5). Therefore, as the ball falls through the air, its inertia causes it to travel laterally (from left to right in FIG. 5), in addition to its forward and downward movement. This is illustrated by the lateral component of the path of travel of ball 117 in FIG. 5, which causes the arc seen in the ball's path as it leaves tube 141. By positioning a funnel 215 under support disc 143 and in the path of travel of falling balls 117 as shown in FIG. 4, the motion of the balls produces a smooth, downwardly converging, spiraling action when the balls contact the conical interior wall of funnel 215. The funnel 215 should be placed so that balls 117 strike the interior conical surface of the funnel away from its axis with a substantial component of motion in a direction normal to the cone's axis, to produce the desired spiraling effect. While the preferred ball feeder 101 emits balls from tubes 141 in intermittent clusters as a given tube approaches its peak of rotation, the use of funnel 215 as described above results in a blending action as the balls spiral towards the funnel's axis, so that the balls form a continuous spiraling stream as they near the bottom of the funnel. This spiraling motion results in a substantially continuous serial flow of the balls out the tip 217 of funnel 215 and into a feeder tube 219 which directs the balls in a serial array into a desired apparatus 221 for further inspection or processing.

While the angle $\phi$, at which the ball feeder 101 is tilted relative to the horizon, is not considered critical, the disclosed apparatus has been successfully operated with angles in the range of 3 to 5 degrees. The maximum rotational speed of ball feeder 101 may vary according to the size and type of ball being fed and the pitch $\theta$ of funnel 215. Rheostat 195 may therefore be adjusted to achieve the maximum flow rate consistent with a smooth, serial flow of balls from tube 219.

While the preferred embodiment discussed above utilizes a cylindrical container 103, the invention is not limited to a container of this shape. So long as the container wall is symmetrical about rotational axis 107 it will provide the desired smooth, rotating movement of the container wall through a load of balls 117.

While ball feeder 101 has been described for illustrative purposes with four outlet ports 133 and tubes 141, the invention is not to be construed as limited to this configuration.

The preferred rotating device 163 utilizes an arrangement of four wheels in contact with cylindrical wall 105, to provide a structure for rotating ball feeder 101 which permits the ball feeder to be rapidly replaced when it exhausts its supply of balls. While this feature is useful in reducing the "down time" of the ball feeder 101, alternate means of rotating the ball feeder may be provided while retaining many of the novel aspects of the invention disclosed. For example, ball feeder 101 may be spun by a shaft aligned with its rotational axis 107. Such a shaft would preferably extend from the top of container 103, in order to prevent interference with the motion of balls 117 leaving tube outlets 213.

What is claimed is:

1. An apparatus for producing a serial flow of balls, comprising:
    a ball feeding apparatus cooperating with means for rotating said ball feeding apparatus about a rotational axis;
    said ball feeding apparatus comprising:
    a container for receiving balls to be fed, having a container wall symmetrically disposed about said rotational axis of said ball feeding apparatus, and a base fixed to and enclosing one end of said container wall, said base having at least one outlet port extending therethrough and spaced along its periphery;
    at least one tubular member corresponding to said outlet port, said tubular member fixed at one end to said base at said corresponding outlet port, curving away from the base and towards said axis, for leading balls away from said container to an outlet at the other end of said tubular member;
    said tubular member having its outlet in closer proximity to said rotational axis than the corresponding outlet port on said container base.

2. An apparatus as in claim 1, further comprising a downwardly converging frusto-conical collecting means mounted in the path of travel of said balls as they emerge from said ball feeding apparatus during the rotation thereof, for translating the motion of said balls into a downward spiral along the interior surface of said collecting means.

3. An apparatus as in claim 1, further comprising a ball transport channel disposed along the interior surface of said container wall and having a channel base defined by said container base, for transporting said balls from the interior of said container to said at least one outlet port, said channel having a width measured in the radial direction of less than twice the diameter of said balls and a depth measured in the axial direction of at least one ball diameter.

4. An apparatus for producing a serial flow of balls, comprising a ball feeding apparatus as in claim 3 mounted on means for rotating said ball feeding apparatus about its axis with said axis at a mild inclination to horizontal;
    said rotating means comprising:
    a rigid framework supporting at least two coaxial wheels and a third wheel, rotatable about a second axis spaced apart from and substantially parallel to said first axis, said first and second axes disposed substantially parallel to the rotational axis of said container, said three wheels contacting the outer surface of said container wall for supporting and rotating said ball feeding apparatus;
    means supporting said ball feeding apparatus in an axial direction, so that said ball feeding apparatus may be inclined relative to horizontal without sliding in an axial direction; and means for rotating at least one of said three wheels contacting said container wall.

5. An apparatus as in claim 4, further comprising shaft means mounted in said container base along said rotational axis for maintaining a tubing support member at a fixed distance away from said container base along said axis;

said at least one tubular member being mounted to said tubing support member and held in fixed position relative to said container.

6. An apparatus as in claim 5, wherein said tubular members comprise lengths of flexible tubing.

7. An apparatus as in claim 6, wherein said axially supporting means comprises a fourth wheel rotatably mounted about an axis normal to and intersecting the rotational axis of said ball feeding apparatus, said fourth wheel contacting a peripheral flange extending from said container wall.

8. An apparatus for producing a serial flow of balls, comprising a ball feeding apparatus cooperating with means for rotating said ball feeding apparatus about a rotational axis;

said ball feeding apparatus comprising:

a container for receiving balls to be fed, having a container wall symmetrically disposed about said rotational axis of said ball feeding aparatus, and a base fixed to and enclosing one end of said container wall;

a ball transport channel disposed along the interior surface of said container wall and having a channel base defined by said container base, for transporting said balls from the interior of said container to at least one outlet port, said channel having a depth measured in the axial direction of at least one ball diameter;

said container base further having said outlet port defined therein between the base of said channel and the exterior of said container, said outlet port providing an axially rotating path through which balls at the base of said channel may flow to said container's exterior.

9. An apparatus as in claim 8, wherein said channel has a width measured in the radial direction of less than twice the diameter of said balls.

10. An apparatus as in claim 9, further comprising a downwardly converging frusto-conical collecting means mounted in the path of travel of said balls as they emerge from said ball feeding apparatus during the rotation thereof, for translating the motion of said balls into a downwardly converging spiral along the interior surface of said collecting means.

* * * * *